J. E. LEONARD.
MOVING PICTURE MACHINE.
APPLICATION FILED MAR. 3, 1911. RENEWED APR. 9, 1914.
1,102,933.
Patented July 7, 1914.
3 SHEETS—SHEET 1.
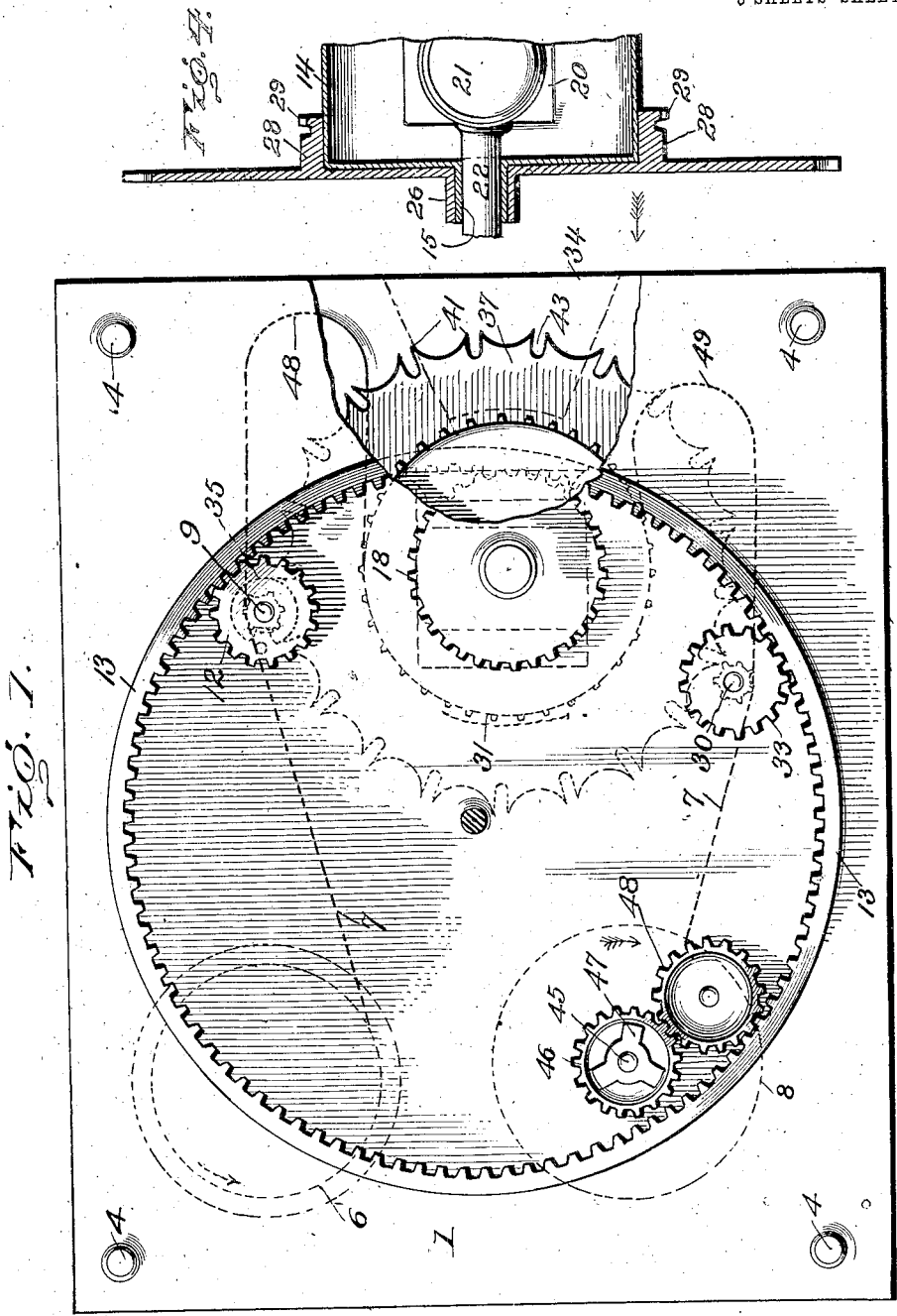
Witnesses
W. A. Williams
C. P. Wright Jr.
Inventor
J. E. Leonard
By A. S. Pattison
Attorney

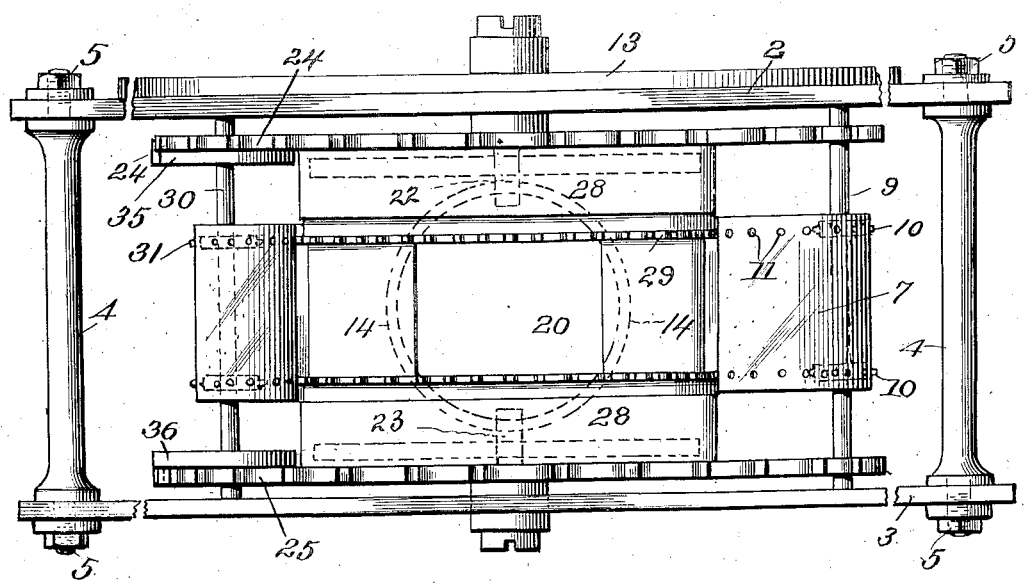
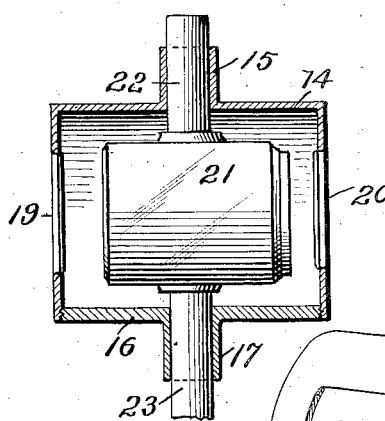

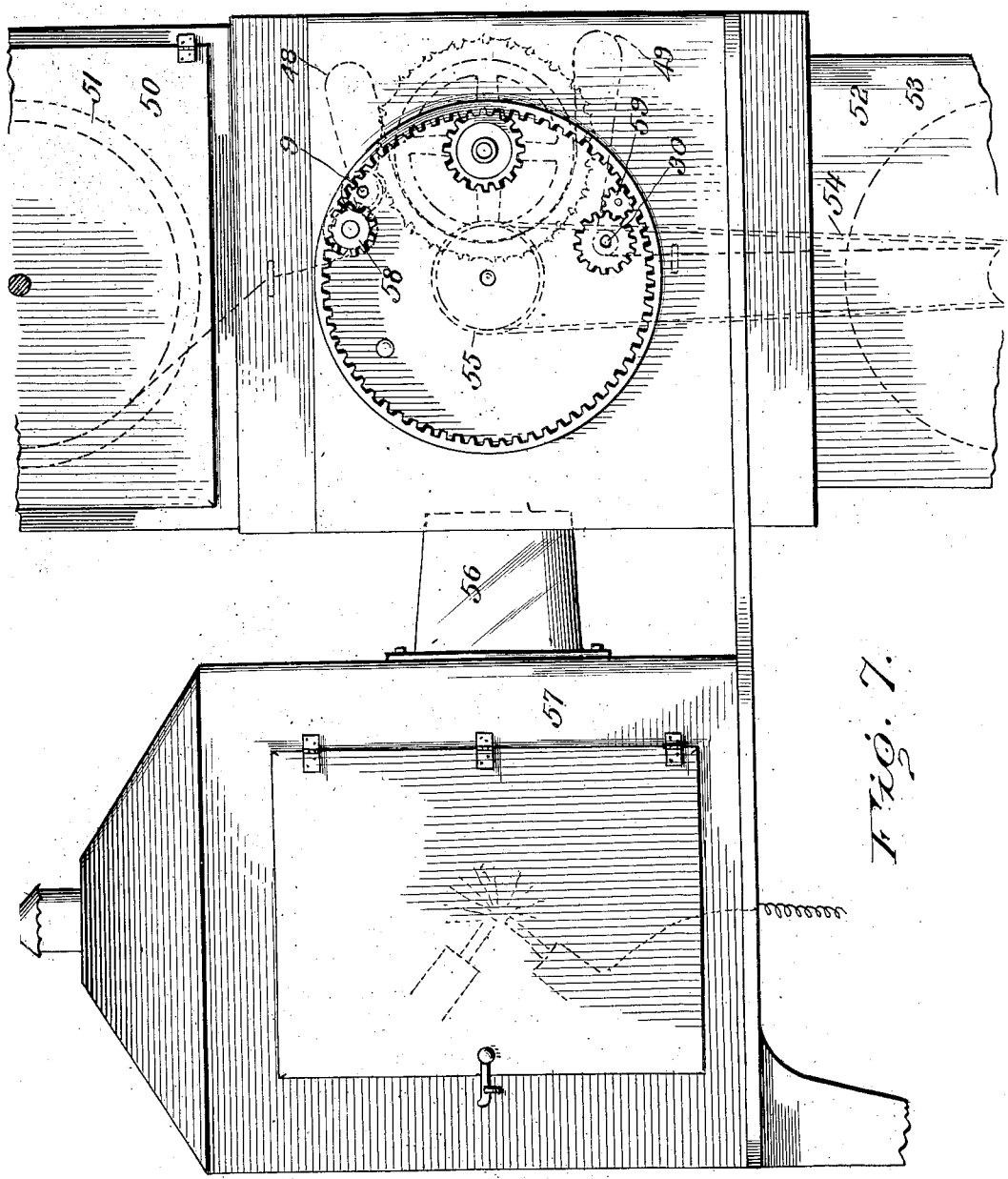

UNITED STATES PATENT OFFICE.

JOHN EDISON LEONARD, OF PORTLAND, OREGON.

MOVING-PICTURE MACHINE.

1,102,933. Specification of Letters Patent. Patented July 7, 1914.

Application filed March 3, 1911, Serial No. 612,126. Renewed April 9, 1914. Serial No. 830,796.

*To all whom it may concern:*

Be it known that I, JOHN E. LEONARD, a citizen of the United States, residing at Portland, in the county of Multnomah and State of Oregon, have invented certain new and useful Improvements in Moving-Picture Machines, of which the following is a specification, reference being had therein to the accompanying drawing.

My invention relates to improvements in moving picture machines.

The object of my invention is to provide a machine of this character in which the lens is surrounded by the shutter and so constructed and arranged that the light is permitted to enter on the exposed film when taking the picture and also allow the light to pass out while projecting the picture.

Another object of my invention is to provide means for feeding the film forward and stopping and starting it at the proper time in respect to the opening and closing of the shutter.

A still further object of my invention is to provide a revolving shutter in which two exposures are made during each revolution of the shutter, thereby making a machine of this character in which the pictures can be more rapidly taken or projected when desired.

A still further object is to provide a machine of this character which will take a film of pictures and also project the pictures and having certain details of structure and operation hereinafter more fully set forth.

In the accompanying drawings: Figure 1 is a side view of my improved machine. Fig. 2 is a front view looking in the direction of the arrow Fig. 1 the left hand end of this view represents the top of the machine. Fig. 3 is a detailed sectional view of the shutter showing the lens in full lines. Fig. 4 is an enlarged sectional view of the shutter showing the means for mounting the spur wheels. Fig. 5 is an enlarged plan view of the spur wheel drive mechanism for moving the same the desired distance to bring a film in a position to be exposed and stopping it for a short period, and after it has been exposed moving the film to bring another picture in position. Fig. 6 is a perspective view of the shutter, showing the two parts of which it is constructed, separated. Fig. 7 is a side elevation partly in section of a projecting moving picture machine embodying my invention.

Referring now to the drawings, 1 represents the frame of my improved machine which consists of the two side plates 2 and 3, spaced the desired distance apart by means of the studs or barrels 4, having the reduced screw-threaded outer ends upon which are screwed the nuts 5, and by means of which the plates are held in their proper position. While I have shown four of these studs or barrels holding the plates in their separated position, it will be understood that any desired number may be used and other means could be used than the plates for forming a frame for carrying the mechanism of the machine. The frame may be mounted in any desired casing and I will not show or describe the same.

Between the plates 2 and 3 at the upper end and adjacent the rear end is a shaft upon which is mounted the spool 6, upon which is mounted the film 7, upon which the pictures are to be taken. In a line directly below the spool 6 is a second spool 8, upon which the film is wound after the pictures are taken and which is driven on the direction indicated by the arrow, Fig. 1, as will be hereinafter more fully described. The film is passed from the spool 6 forward and over the small spool or shaft 9, having teeth 10 passing through the openings 11 in the film 7 and whereby the film is properly drawn from the spool 6. The shaft 9 extends through the plate 2 and is provided with a pinion 12, meshing with the large internal gear 13, which is mounted upon the plate 2 of the frame 1 in any desired manner and may be driven in any desired manner. This internal gear 13 not only forms the means for operating the film, but also forms the means of operating the shutter, whereby the shutter is timed with the feeding of the film.

The shutter consists of a cylindrical member 14 having a projecting hollow stud or trunnion 15 carried by one end. The lower end 16 of said cylindrical member is screwed in the shutter for the purpose hereinafter described. The said end 16 is provided with a hollow trunnion 17, and said trunnions extend through the plates 2 and 3 of the frame and form bearings for the shutter. The trunnion 15 above the plate 2 is provided with a gear 18, meshing with the internal gear 13, and whereby the shutter is caused to revolve.

The cylindrical shutter is provided on opposite sides with openings 19 and 20. Within the shutter is the lens 21, which is provided with trunnions 22 and 23, which extend out through the hollow trunnions 15 and 17, and said trunnions 22 and 23 are held against rotation so that the lens is held against rotation in the shutter. The lens is preferably of a cylindrical form having the double lens and extends longitudinally of the frame 1.

Mounted loosely upon the upper and lower ends of the shutter are toothed wheels 24 and 25, which are provided with trunnions 26 and 27 surrounding the trunnions 15 and 17 of the shutter, whereby the wheels are free to rotate on the shutter independent thereof. The said wheels are provided with inwardly extending flanges 28, surrounding the periphery of the shutter and provided at their inner end with the teeth 29, which pass through the openings 11 in the edges of the film, whereby the film is fed. These flanges of the toothed wheels 24 and 25 extend inwardly adjacent the openings 19 and 20 of the shutter so as to bring the film across said openings.

Mounted in the frame is a shaft 30 having teeth 31 which enter the openings 11 in the film which is drawn rearwardly from the loop 49. The shaft 30 on the outside of the plate 2 of the frame is provided with a gear 33, meshing with the internal gear 13, whereby the shaft 30 is rotated at the same rate of speed as the shaft 9.

The light enters the machine through the opening 34 and passes through the lens, the shutter having the oppositely arranged openings 19 and 20, there will be two exposures at each revolution of the shutter, and the picture is taken on the film at the point 31, shown in Fig. 1 of the drawing.

The shaft 30, on the inside of the plates 2, is provided with cam-shaped members 35 and 36, which are adapted to operate with the teeth of the toothed wheels and drive the toothed wheels so as to move the film a distance to bring a new section of film to the point 31 and stop it until it has been exposed so that the pictures are taken in close succession. The cam-shaped members are exactly alike, and I will proceed to describe one, reference being had to Fig. 5 of the drawings. In this figure the toothed wheel 24 has the teeth 37, each having the concaved outer face 38, closely fitting the round portion 39 of the cam-shaped member 35. The recess 40 formed in the cam-shaped members is adapted to receive the two points 41 of the two adjoining teeth, while the pin 42 enters the space 43 between said teeth. From this description it will be seen that as the round portion of the cam is in the concaved portion 38 of the teeth the spur wheel, the film is at rest, but when the pin 42 enters the space 43 the spur wheel is turned sufficiently to bring another section of film to the point 31. By this time the shutter has made a half revolution and the film at the point 31 is exposed. By this construction it will be seen that the film is fed forward just sufficient to bring a fresh portion opposite the point 31 and that the pictures are taken very rapidly. The speed at which the picture is taken is determined by the rotation of the internal gear 13, and the shutters and the film are so timed that it is impossible to take two pictures on the same section of the film, and the film comes to a full stop while it is being exposed.

The spool 8 is carried upon the shaft 45, so that it can slip thereon. This is very essential as the shaft is driven by the internal gear 13 and as the spool becomes filled the film will wind more rapidly with the same rotation of the shaft and therefore the slip-friction drive is essential. This shaft on the outside of the frame is provided with a gear 46 loosely mounted thereon and surrounding the shaft and bearing against said gear is a spring member 47, which frictionally connects the gear to the shaft. The gear 46 meshes with the gear 48, which in turn meshes with the internal gear 13.

The film passes from the spool 6 over the teeth carried by the shaft 9 and is looped forwardly, as indicated at 48, and passes rearwardly around the flanges 28 of the spur wheels 24 and 25 and is looped forwardly as indicated at 49, and then passes inwardly over the teeth carried by the shaft 30 and is wound upon the spool 8. The teeth of the shaft 30 feed the film from the loop 49 to the spool 8, and the pulling action on the film caused by the spool becoming filled and thus prevent the looping of the film at 49.

In Fig. 7, I show my improved machine as used for projecting the pictures from the films. In projecting pictures it has been found essential to have two or more films upon one spool and instead of mounting the spools in the casing, as shown in Fig. 1, a housing 50 is placed above to hold the spool 51 containing the film to be projected and a housing 52 is placed below to hold the spool 53 upon which the film is wound. This as will be readily understood enables larger reels to be placed in the machine. The reel 53 is driven by a belt or chain 54, which is driven by a pulley 55, carried by the machine as shown in Fig. 7.

The casing 1 is constructed the same as the frame in the machine used in taking the pictures and, except as above noted, the same reference numerals indicate similar parts.

The frame at the rear is provided with an opening into which extends a funnel-shaped member 56 extending from the lamp case 57.

The lamp may be of any type, but preferably is an electric arc lamp as shown.

In projecting pictures the film travels faster than when taking the pictures and, therefore, the gear 12 meshing with the internal gear 13 has been reduced, whereby the film is more rapidly moved. In order that the shafts 9 and 30 may be driven more rapidly to prevent any pulling upon the film and to cause an even feeding of the film, I provide the intermediate gears 58 and 59, meshing with the gears 12 and 33 and reducing the gears 12 and 33, so that the feeding of the film will be uniform throughout.

Having thus described my invention, what I claim and desire to secure by Letters Patent is:

1. A moving picture machine, comprising a lens, a shutter surrounding the lens and having oppositely arranged openings, a film passing around the shutter and means for intermittently driving the film.

2. A moving picture machine comprising a lens, a cylindrical shutter surrounding the lens and having oppositely arranged openings, members loosely mounted upon the shutter, a film passing around said members and means for intermittently driving the members, substantially as shown and described.

3. A moving picture machine, comprising a lens, a cylindrical shutter surrounding the lens and having two oppositely arranged openings, spools loosely mounted upon the ends of the shutter, a film passing over said spools and means for intermittently driving said spools.

4. A moving picture machine, comprising a lens, a rotary cylindrical shutter having two oppositely arranged openings opposite the lens, spools rotatably mounted on the ends of the shutter, a film passing around the shutter and means for intermittently driving the spools for feeding the film forward when the openings in the shutter are not registering with the lens.

5. A moving picture machine, comprising a lens, a cylindrical shutter having oppositely arranged openings in opposite walls thereof in a line with the lens, spools rotatably mounted on the ends of the shutter, a film passing over said spools and driven thereby, outwardly extending flanges carried by the outer ends of the spools and means engaging said flanges for intermittently driving the spools for feeding the film.

6. A moving picture machine, comprising a lens, a rotary shutter surrounding the lens and having two oppositely arranged openings, spools loosely mounted upon the ends of the rotary shutter, a film passing over the spools, spur wheels rigidly carried by the outer ends of the spools, and means engaging the spur wheels for rotating the spools for intermittently feeding the film forward when the shutter is closed.

7. A moving picture machine comprising a lens, a rotary cylindrical shutter surrounding the lens and adapted to make two exposures during each revolution of the shutter, spools loosely mounted upon the ends of the shutter, a film passing over the spools, a spur wheel carried by the outer end of each spool, a rotary member around which the film passes, and means carried by said rotary member for engaging the spur wheel and intermittently feeding the film forward.

8. A moving picture machine, comprising a lens, a cylindrical rotary shutter surrounding the lens and having oppositely arranged openings, means for rotating the shutter, spools mounted upon opposite ends of the shutter, a film passing over the spools, laterally extending spur wheels carried by the ends of the spools, a rotary member around which the film passes, means carried by said rotary member for engaging the spur wheels and intermittently driving the same, and said driving means timed with the shutter driving means, whereby the film is held still during each exposure of the lens.

9. A moving picture machine comprising a lens, a shutter surrounding the lens and having oppositely arranged openings, spur wheels loosely mounted on the ends of the shutter and having inwardly extending flanges, a film passing over said flanges, a cam shaped member engaging the teeth of said spur wheel and adapted to rotate the same a portion of its revolution, whereby the film is moved a predetermined distance and stopped at a time when the oppositely arranged openings in the shutter register with the lens.

10. A moving picture machine, comprising a lens, a shutter surrounding the lens and having oppositely arranged openings, a spur wheel mounted upon the ends of the shutter and having teeth provided with concaved faces and recessed portions between the same, the said spur wheels having inwardly extending flanges around which the film passes, a cam-shaped member adapted to fit in the concaved faces of the teeth of the spur wheels and having a pin adapted to enter the recessed portion between the teeth to move the spur wheel a predetermined distance, whereby the film is fed across the lens at a time when the openings in the shutter are out of alinement with the lens.

11. A moving picture machine, comprising a winding and unwinding spool, a film connecting said spools, a lens, a rotary shutter between the lens and the film, spur-wheels loosely mounted upon the shutter, a rotary member around which the film passes, means carried by the upper end of said rotary shutter for engaging the spur wheel and intermittently driving the same.

12. A moving picture machine comprising a winding and unwinding spool, a film connecting said spools, a lens, a rotary shutter operated between the lens and the film, spur-wheels loosely mounted upon the ends of the shutter, rotary members upon opposite sides of the spur-wheels and around which the film passes, cam-shaped members carried by the upper and lower ends of the rotary member and engaging the spur wheels and constructed and arranged to intermittently drive the spur wheels.

13. A moving picture machine comprising a winding and unwinding spool, a film connecting the same, a lens, a rotary shutter between the lens and film and continuously rotated, a spur-wheel at the ends of the shutter and having rearwardly extending flanges over which the film passes, rotary members on the sides of the spur wheels and around which the film passes, said spur-wheels having teeth provided with concaved outer faces separated by radial grooves, cam-shaped members adapted to fit the curvature of the teeth and adapted to receive the pointed portions of the two abutting teeth, and a pin adapted to enter the rotary groove between the two teeth and rotate the said spur wheels a short distance to cause the film to be fed forward a distance to bring another picture opposite the lens.

14. A moving picture machine, comprising a lens, a rotary cylindrical shutter surrounding the lens and having two oppositely arranged openings whereby the lens is exposed twice to every revolution of the shutter, a rotary member mounted upon the shutter independent of its movement, a film passing over said rotary member, and means for intermittently driving said rotary member whereby the film is held still during the exposure of the lens by the shutter.

15. A moving picture machine comprising a lens, a cylindrical rotary shutter surrounding the lens and adapted to expose the lens twice to every revolution of the shutter, a film passing over the rotary shutter, a lamp in line with the lens in rear of the film, and means for driving the film and constructed and arranged to stop the film during the time when the lens is exposed to the lamp.

16. A moving picture machine, comprising a lens, a rotary shutter surrounding the lens, and having oppositely arranged openings, a lamp in rear of said lens and in line therewith, a film traveling between the shutter and the lamp, means for stopping the film when the oppositely arranged openings are in alinement with the lens, and means for moving the film when the shutter is making a half revolution to bring the openings opposite the lens.

17. A moving picture machine, comprising a winding and unwinding spool, a film connecting the same, a lens, a rotary shutter between the lens and film and continuously rotated, a lamp in rear of the film and adapted to project the light through the film and lens, a spur wheel at the ends the shutter and having rearwardly extending flanges over which the film passes, rotary members on each side of the spur wheels and around which the film passes, said spur wheels having teeth provided with concaved outer faces separated by radial grooves, cam-shaped members adapted to fit in the curvature of the teeth and adapted to receive the pointed portion of the two abutting teeth, a pin adapted to enter the radial groove between adjacent teeth and rotating the said spur wheels a short distance to cause the film to be fed forward a distance to bring another picture opposite the lens, and an internal gear meshing with gears carried by the shutter and the cam-shaped members whereby the film is timed with the shutter.

18. A moving picture machine, comprising a lens, a shutter surrounding the lens and having oppositely arranged openings, spur wheels loosely mounted on the ends of the shutter and having inwardly extending flanges, a film passing over said flanges, means for engaging the teeth of said spur wheel and adapted to rotate the same a portion of its revolution, whereby the film is moved a predetermined distance and stopped at a time when the shutter is exposing the lens.

19. A moving picture machine, comprising a lens, a shutter having oppositely arranged openings to expose the lens, a spur wheel mounted upon the ends of the shutter, and having teeth provided with concaved faces and recessed portions between the same, said spur wheel having inwardly extending flanges over which the film passes, a cam-shaped member adapted to fit in the concaved faces of the teeth of the spur wheel and having a pin adapted to enter the recessed portion between the teeth to move the spur a pre-determined distance, whereby the film is fed across the lens at a time when the shutter is not exposing the said lens.

20. A moving picture machine comprising a lens, a rotary shutter, a spur wheel mounted upon the ends of the shutter and having teeth provided with concaved faces and recessed portions between the same, a spur wheel having inwardly extending flanges around which the film passes, a cam-shaped member adapted to fit in the concaved faces of the teeth of the spur wheels and having a pin adapted to enter the recessed portion between the teeth to move the spur wheel a predetermined distance, whereby the film is fed across the lens at a time when the openings in the shutter are out of alinement with the lens.

21. A moving picture machine comprising a winding and unwinding spool, a film connecting the same, a lens, a rotary shutter between the lens and film and continuously rotated, a spur wheel at each end of the shutter and having rearwardly extending flanges over which the film passes, rotary members upon each side of the spur wheels around which the film passes, teeth carried by said spur wheels, a cam-shaped member adapted to coöperate with the said teeth and rotating the said spur wheels a short distance to cause the film to be fed forward a distance to bring another picture opposite the lens and an internal gear meshing with the gears carried by the shutter, and the cam-shaped member whereby the film is timed with the shutter.

In testimony whereof I hereunto affix my signature in the presence of two witnesses.

JOHN EDISON LEONARD.

Witnesses:
L. W. McDONNELL,
MARGARET WHITE.